Nov. 4, 1947.  J. C. EASTES  2,430,217
MACHINE FOR BENDING TUBES, BARS, AND THE LIKE
Filed July 10, 1944  9 Sheets-Sheet 1

INVENTOR
J. C. Eastes
By Watson, Cole,
Grindle & Watson

Nov. 4, 1947. J. C. EASTES 2,430,217
MACHINE FOR BENDING TUBES, BARS, AND THE LIKE
Filed July 10, 1944 9 Sheets-Sheet 2

Fig. 3.

INVENTOR
J. C. Eastes
By Watson, Cole, Grindle
& Watson

Nov. 4, 1947.  J. C. EASTES  2,430,217
MACHINE FOR BENDING TUBES, BARS, AND THE LIKE
Filed July 10, 1944  9 Sheets-Sheet 7

INVENTOR
J. C. Eastes
By Watson, Cole, Grindle &
Watson

Nov. 4, 1947.　　　　J. C. EASTES　　　　2,430,217
MACHINE FOR BENDING TUBES, BARS, AND THE LIKE
Filed July 10, 1944　　　　9 Sheets-Sheet 8

INVENTOR
J. C. Eastes
By Watson, Cole, Grindle & Watson

Patented Nov. 4, 1947

2,430,217

UNITED STATES PATENT OFFICE 2,430,217

MACHINE FOR BENDING TUBES, BARS, AND THE LIKE

John Colbran Eastes, Weybridge, England, assignor to Vickers-Armstrongs Limited, Westminster, London, England Application July 10, 1944, Serial No. 544,191
In Great Britain July 10, 1943

12 Claims. (Cl. 153—48)

The invention has for its object to provide an improved construction of machine for use in bending metal tubes, bars and like objects, including drawn and extruded metal sections.

A machine in accordance with the invention comprises two dies arranged in tandem, through which the work-piece is passed in succession, the first of such dies being stationary and the second being movable about two axes inclined to each other and to the longitudinal axis of the unbent work-piece so as to be capable of completely universal pivotal movement about said longitudinal axis in relation to the stationary die, and means for moving the pivotal die in the required direction and for impelling or drawing the work-piece through the dies during the bending operation.

Simple bends, i. e., in which the bent portion of the work-piece lies wholly in one plane, are produced by a movement of the pivotal die about one axis. Where compound or helical bends are required a simultaneous movement of the said die about both its pivot axes is effected. Where a plurality of simple bends are required, with the bends in different planes, such for example as would be necessary to fabricate a tubular chair-frame from a single length of stock material, it is convenient to make each successive bend by moving the pivotal die about the same axis, and to rotate the work-piece between successive bending operations so as to obtain the requisite angularity of one bend relative to another. The invention accordingly provides means whereby the work-piece may be rotated about its longitudinal axis for this purpose.

The movable die may be operated, and the work-piece may be rotated, either manually or by power-actuated means such as a hydraulic motor or the like.

The nature of the invention and the manner of its performance are hereinafter more fully explained with reference to the following description of the completely power-operated tube-bending machine which is illustrated in the accompanying drawings. In said drawings.

Considered in its broadest aspect, the machine illustrated in said drawings comprises the essential component features of means for supporting the work-piece, the bending dies and means for their operation, means for feeding the work-piece through the dies, means for rotating the work-piece about its longitudinal axis, means for regulating the speed of feed of the work-piece during bending operations, and various minor features. The following description refers to these several features seriatim.

(a) Means for supporting the work-piece

Figure 5:
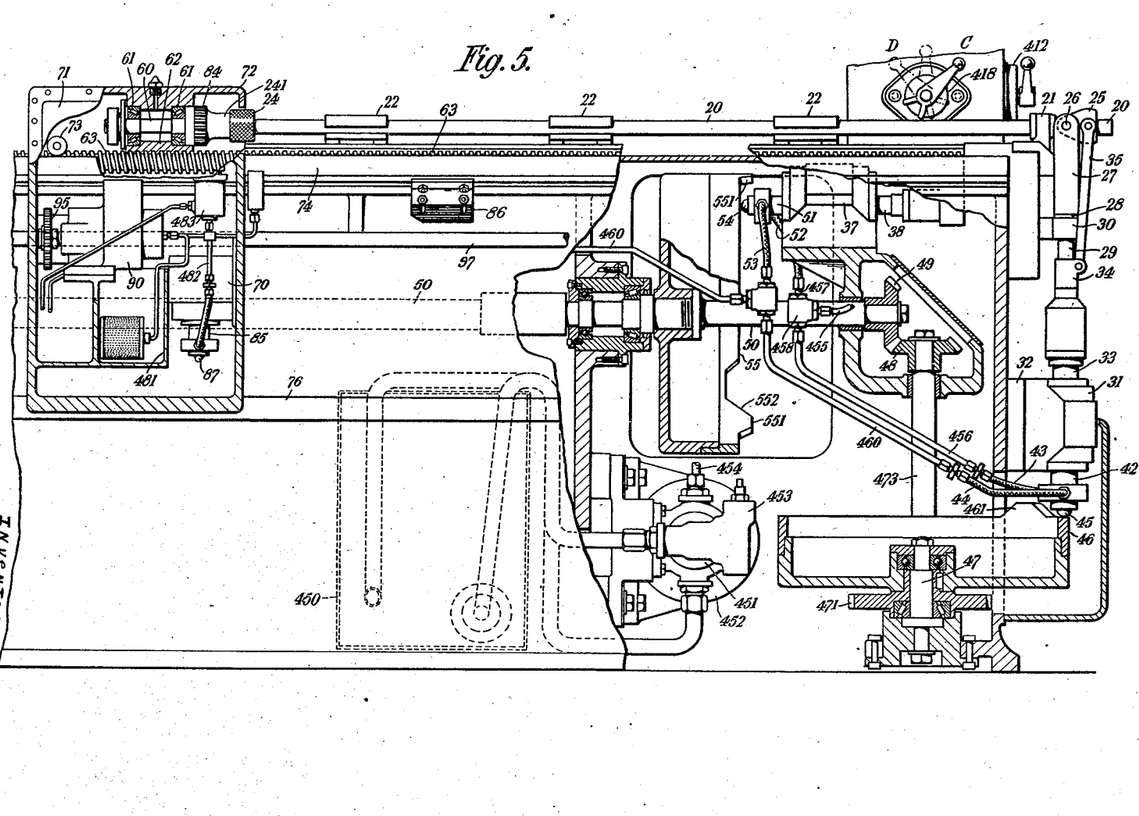

The work-piece, which in the present instance is exemplified by a length of metal tubing denoted by the reference numeral 20, is held in axial alignment with the axis of the stationary die 21 by means of a plurality of spaced steadies 22 (hereinafter more particularly described with reference to Figs. 11 and 12) which are mounted upon the bench 23 of the machine. The rear end of the tube 20 is gripped by a collet chuck 24 (Fig. 5). In an alternative arrangement not shown in the drawings said chuck is made tubular so as to be capable of gripping a work-piece at an intermediate point in its length.

(b) The bending dies and means for their operation

The bending operation is performed by feeding the work-piece successively through the aforesaid stationary die 21 and a movable die 25, which latter is mounted with capability of being pivoted independently about a vertical axis and/or a horizontal axis at right angles to the longitudinal axis of the work-piece. The stationary die 21 is securely fastened upon the bench 23; the movable die 25 is mounted in trunnions 26 which are journalled for movement about their horizontal axis between the arms 27 of a carrier 28. The carrier 28 is mounted upon a vertical spindle 29 and supported by an offset bearing bracket 30 fixed to the end of the machine frame.

Figure 6:
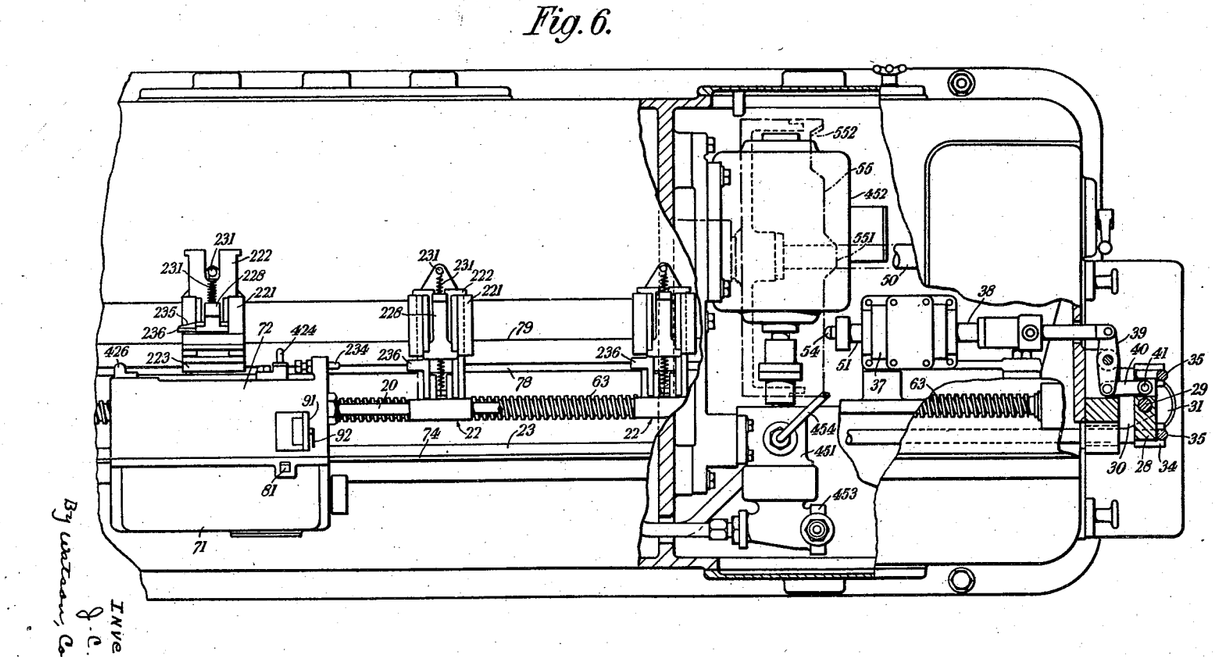
Fig. 6 is a plan view of that part of the machine which is shown in elevation in Fig. 5.

Mounted beneath the die 25 is a hydraulic reciprocating motor 31 carried by a bracket 32. Said motor 31 (the internal mechanism and manner of operation whereof are hereinafter described with reference to Fig. 9) incorporates a reciprocatory ram 33 at the upper extremity of which is fixed a cross-head 34 connected by pivotal links 35 to a pair of pivots 36 on the movable die 25, the reciprocatory motion of the ram 33 operating to move the die 25 about the horizontal axis of the trunnions 26. The movement of the die 25 about the vertical axis of the spindle 29 is effected by means of a hydraulic reciprocating motor 37 (Fig. 6) through the medium of its ram 38, a lever 39 coupled thereto, and a link 40 which connects said lever 39 to a pivot 41 on the underside of the carrier 28. The upper extremity of the ram 33 is socketed to receive the lower end of the spindle 29 so that the latter thus serves to guide said ram 33 in its axial movement. The motor 37 is of similar construction to the motor 31 and its internal mechanism and manner of operation will be appreciated from the description of Fig. 9, as hereinafter set forth.

Figure 7:
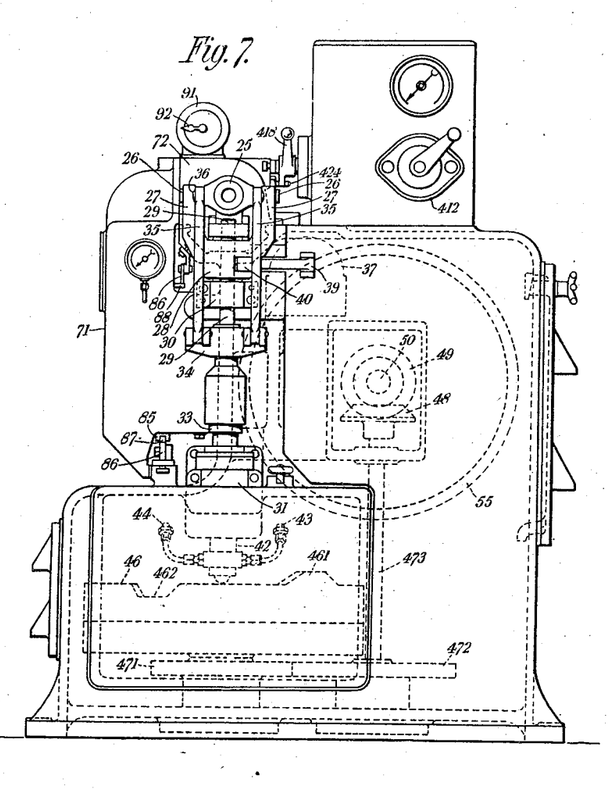
Fig. 7 is an elevation of the machine as seen from the die end thereof.
Figure 9:
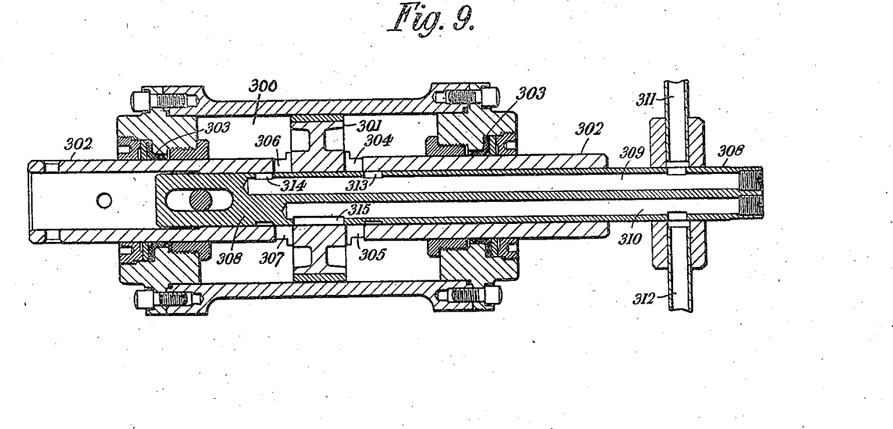
Fig. 9 is a longitudinal section of a hydraulic reciprocating motor typical of those embodied in the machine.

The motors 31 and 37 are of the kind in which a piston-valve arranged co-axially with the piston rod or ram operates so that a certain degree of movement of the valve in one direction produces a corresponding degree of motion of the piston or ram in the same direction. In the case of the motor 31, the ram 33 is operated by imparting a suitable axial movement to the valve 42 which projects from the lower end of the motor, carrying flexible couplings 43, 44 to the fluid pressure supply and exhaust and, at its extremity a cam-follower 45 (see Figs. 5 and 7). The axial movement of the valve 42 is effected by the cooperation of the cam follower 45 with the edge-cam 46, which is suitably profiled at 461, 462, and which is mounted on a vertical shaft 47, driven through spur-gearing 471, 472 from the vertical shaft 473 which is in turn driven through bevel-gearing 48, 49 from the horizontal cam-shaft 50. Similarly, the ram 38 of the motor 37 is operated by imparting a suitable axial movement to its valve 51 which projects from the end of the motor and carries flexible couplings 52, 53 to the fluid pressure supply and exhaust. At the extremity of the valve 51 is a cam-follower 54. The axial movement of the valve 51 is effected by the co-operation of the cam-follower 54 with the edge-cam 55, which is suitably profiled at 551, 552, and which is mounted on the said cam-shaft 50. Each of the motors 31 and 37 incorporates a powerful compressed spring (not shown) which acts upon the relative valve (42 or 51) to maintain its cam-follower (45 or 54) in contact with the profiled face of the edge-cam (46 or 55).

(c) *Means for feeding the work-piece through the dies*

The collet chuck 24, by which the work-piece 20 is gripped as aforesaid, is mounted on a rotary spindle 60 supported between combined thrust-and-journal bearings 61 in a saddle 62, the underside of which is formed as a half-nut working on the lead-screw 63 (Fig. 5). Said screw 63 extends throughout the length of the bench 23 and is carried at the left-hand end by combined thrust- and-journal bearings 64 (Fig. 3) and intermediate bearings 641. The left-hand end of said screw 63 is coupled at 65 to the shaft 66 of a rotary fluid motor 67 from which is derived the necessary drive to rotate the screw 63 and traverse the saddle 62 along the bench 23, both when feeding the tube 20 through the dies, and when returning the chuck 24 to the starting point preparatory to the insertion of a fresh work-piece.

(d) *Means for rotating the work-piece about its longitudinal axis*

Power-operated means are provided for rotating the collet chuck 24 about the longitudinal axis of the tube 20, during the production of a series of simple bends lying in different planes, and such means comprise a reciprocating fluid-pressure motor 70 (of similar type to the motors 31 and 37) which is disposed in a vertical position in an enclosed carriage constituted by the casings 71, 72, said casing 72 being formed integrally with the saddle 62. The carriage is additionally supported by a roller 73 running on a rail 74 which forms an integral part of the bench 23; a slide 75 on the casing 71 works along the surface of the machine bed at 76 and a slide 77 on the casing 72 works along the edge of the bench 23 at 78, where it is retained by a rail 79 bolted to the bench. The ram 80 of the motor 70 is extended in the form of a rack 81, slidably guided at 82, and meshing with an intermediate pinion 83 which in turn meshes with a pinion 84 formed on the stock 241 of the collet chuck 24. Thus, an upward movement of the ram 81 from the datum position depicted in Fig. 8 (effected by imparting a corresponding upward movement to the valve 85) produces a partial anticlockwise rotation of the chuck 24 and work-piece 20. Similarly, a downward movement of the ram 81 (effected by a corresponding downward movement of the valve 85) produces a partial clockwise rotation of the work-piece 20.

Figure 8:
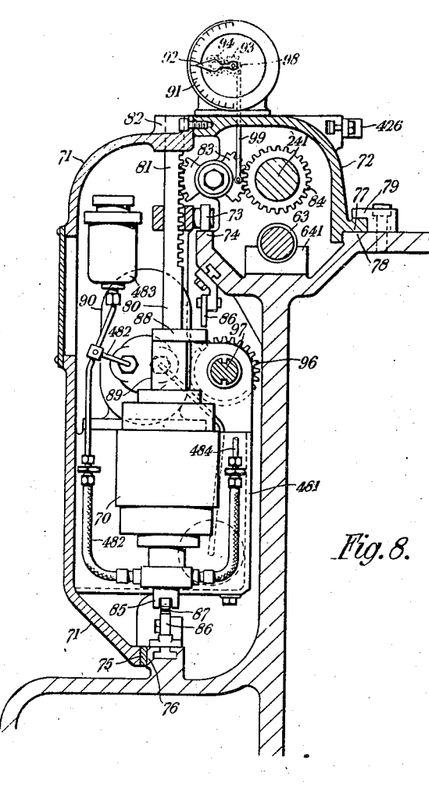
Fig. 8 is a vertical section of the tube-feeding carriage which incorporates self-contained mechanism for rotating the work-piece about its longitudinal axis.

The requisite movements of the valve 85 of said motor 70 are imparted by means of cam-like kicker-plates 86 which are bolted to the machine frame at the points in the path of the carriage where they will appropriately cooperate with either a bowl 87 rotatably mounted in the foot of the valve 85, or with a lug 88 which is mounted upon a sleeve 89 surrounding the ram 81 and which is connected to the valve 85, upward movements of the valve being brought about by locating the lower kicker-plates 86 in positions where they will raise the bowl 87 to the requisite extent, and downward movements of the valve 85 being effected by similarly adjusting the upper kicker-plates 86 in relation to the lug 88.

The carriage 71, 72 incorporates a self-contained hydraulic system for supplying fluid pressure to the motor 70, including a pump 90 driven through the gears 95, 96 by a constantly rotating splined shaft 97 at any position of the carriage in its traverse along the machine; said shaft 97 is driven through the spur gearing 130, 131 from an electric motor 132.

The angular position of the tube 20 is indicated upon a dial 91 by a pointer 92 which is operated through gearing 93, 94 by an arm 98 fixed to the gear 94 and connected at its free end to an upright link 99 which is pivotally connected to the intermediate pinion 83, the arrangement being such that said pointer 92 reproduces the movements of the rack 81 and thereby indicates the position of the work-piece.

(e) *Means for regulating the speed of feed of the work-piece through the dies during the bending operations*

Whilst it is desirable that the time occupied by the complete sequence of operations in the production of a bent work-piece should be minimized, it is on the other hand advantageous to decelerate the work-piece feed during the actual formation of the bends, in order to facilitate the control of the machine at such times. The machine illustrated in the accompanying drawings comprises means for automatically reducing the speed of the work-piece feed during bend formation to one-half the normal rate, such means consisting of a regulator valve 100 governing the fluid pressure supply to the tube-feed motor 67, said valve 100 being controlled by a lever 101 which is linked by a connecting rod 102 with a lever 103 pivoted at 104. Fixed to said lever 103 concentric with its pivot axis is a quadrant 105 which meshes with a vertical rack 106 slidably guided on the machine frame and bearing a bowl 107 which cooperates with the profiled face of an edge-cam 108. A spring (not shown) serves to maintain said bowl 107 in contact with the cam-face. Said cam 108 is mounted on a shaft 109 which is driven through the bevel gearing 110, 111 from the cam-shaft 50, so that the cam 108 rotates at the same rate as the cams 46 and 55 which control the movements of the dies 21 and 25. The profile of the cam 108 is determined by the number and relative spacing of the bends in the work-piece, a depression 112 being provided in the cam-face to bring about the required downward movement of the rack 106 and a consequent adjustment of the valve 100 as the position of an intended bend is reached, reducing the rate of feed of the work-piece 20 at that point and for the duration of the bending operation.

The necessity for reducing the speed of the motor 67 arises only during the outward journey of the saddle 62, and in order to permit the latter to be returned as quickly as possible to its starting point, after a bent tube has been removed, means are provided in the hydraulic circuit relating to the tube-feed motor 67 whereby the valve 100 may be by-passed through a one-way valve which is automatically closed when said motor 67 is running in the forward direction. Further particulars of such by-pass and of said one-way valve are hereinafter given in the description of the general hydraulic system of the machine.

(f) *Sundry minor features*

Figure 1:
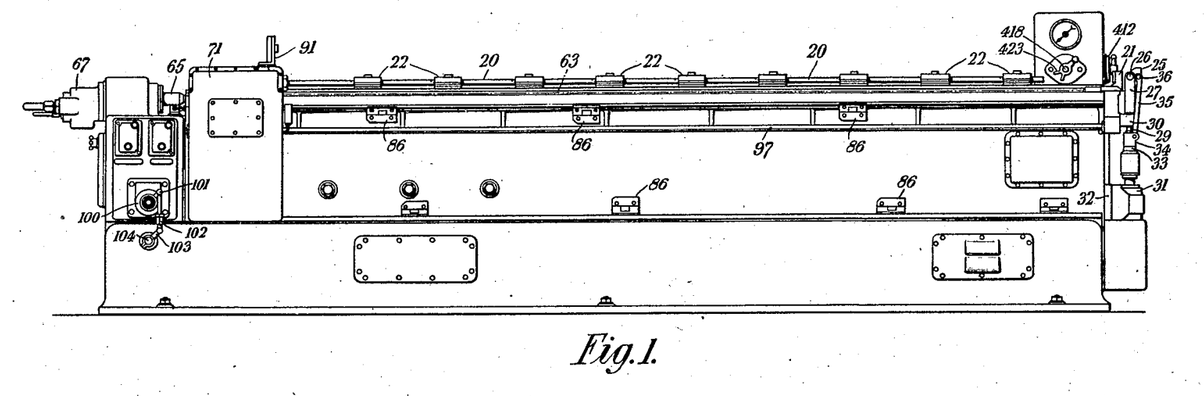
Figs. 1 and 2 are respectively a longitudinal front elevation and a plan of the complete machine.
Figure 2:
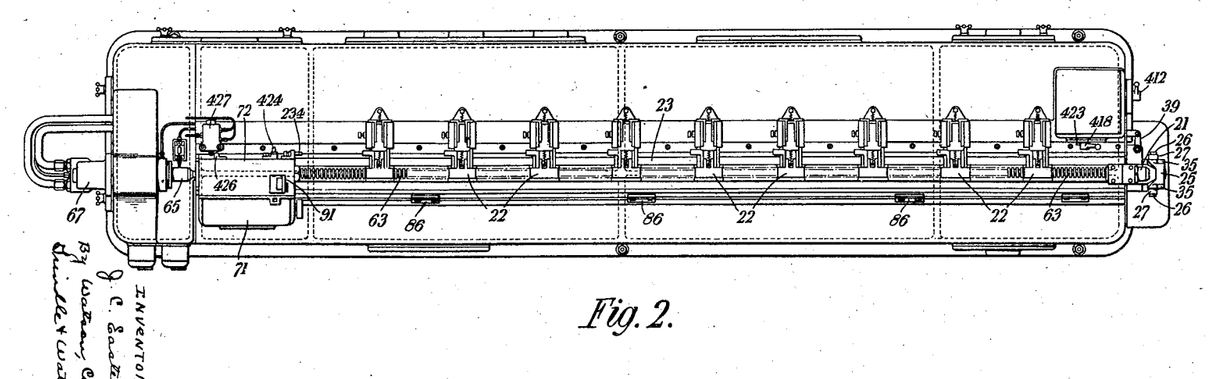
Figure 3:
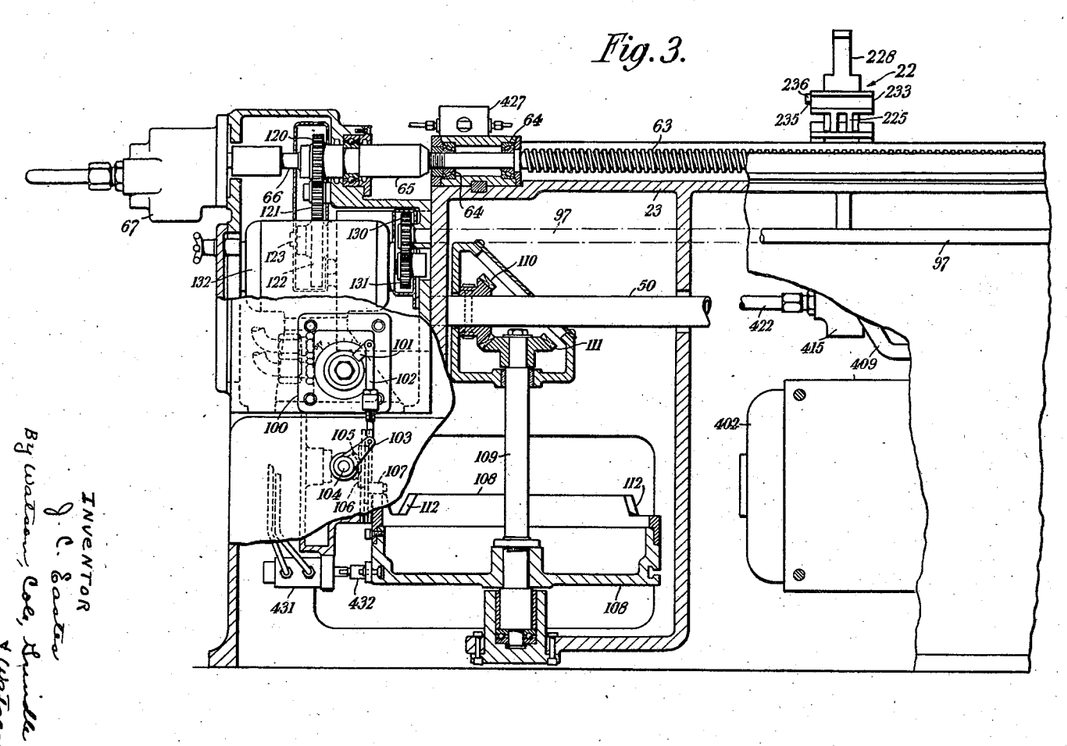
Figs. 3, 4 and 5 collectively constitute a partly sectional longitudinal elevation of the machine drawn to a larger scale.
Figure 10:
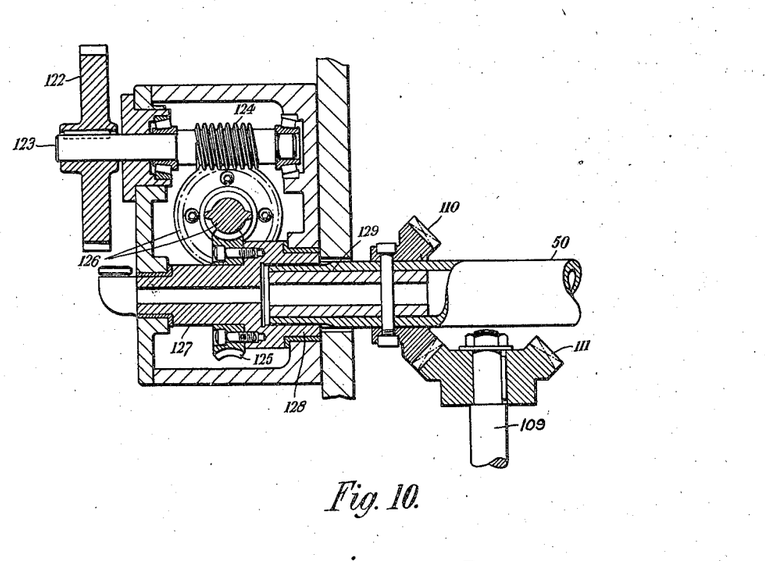
Fig. 10 is a sectional detail of the gear transmission between the main tube-feed motor drive and the cam-shaft drive by which the bending dies are actuated.

The gearing by which the drive is transmitted from the fluid motor 67 to the cam-shafts 50 and 109 is illustrated in Figs. 3 and 10. A spur wheel 120 on the shaft 66 of the motor 67 meshes with an idler 121 which transmits the drive to the pinion 122; the latter is mounted on the shaft 123 of a worm 124 which drives a worm-wheel 125 through a double worm-reduction gear 126. This is fixed on a shaft 127 which is connected by a splined coupling 128, 129 with the cam-shaft 50, from which the cam-shaft 109 receives its drive through the bevel gearing 110, 111, as already stated.

The shaft 97, by which the pump 90 on the travelling carriage is driven, receives its rotary motion through the spur gearing 130, 131 from an electric motor 132.

For the sake of simplicity of illustration the operative faces of the cams 46, 55 and 108 are shown as though fashioned on a single profiled annulus in respect of each cam, and it would of course be possible to provide a separate annulus for each cam to suit each given sequence of bending operations. As will however be understood, it is more practical to make the cam carriers of plain drum shape and to provide means for bolting thereto independent cam-plates of suitable profile and length according to the relative timing and respective duration of the bending operations, such cam-plates being capable of being rapidly and easily adjusted in preparation for a different sequence of operations.

Figures 11, 12:
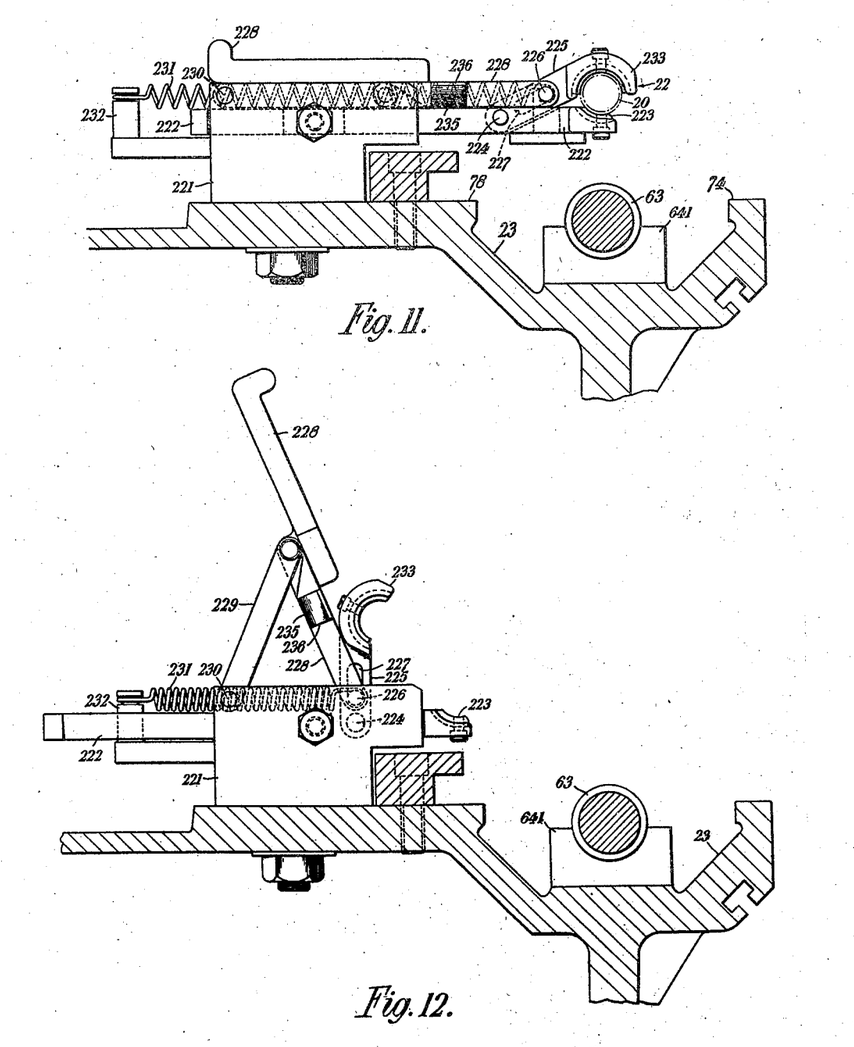
Figs. 11 and 12 are sectional elevations of the "steadies" employed to support the work-piece, respectively as seen in the operative and open positions.

The steadies 22, by which the work-piece 20 is supported in the machine whilst being fed through the dies, are illustrated on a larger scale in Figs. 11 and 12 of the drawings. Each steady comprises a bracket 221 in which a slide 222 is adapted to move between the respective positions shown in Figs. 11 and 12 along a line at right angles to the longitudinal axis of the workpiece 20. The slide 222 carries at its inner extremity an arcuate pad 223 which, when the slide is in the position shown in Fig. 11, constitutes a support for the work-piece. Pivoted at 224 to said slide 222 is a lever 225 attached by a pin and slot connection 226, 227 to a hand-lever 228 connected by a link 229 to a fixed pivot 230 on the bracket 221. A tension spring 231 connects the pin 226 with a fixed anchorage 232 and is arranged to exert a rectilinear pull in a rearward direction upon the pin 226 in such manner as to tend to raise the lever 225 to the position shown in Fig. 12. The lever 225 has at its free extremity a semi-cylindrical cap 233, which, when the lever 225 is in the position shown in Fig. 11, serves to embrace the work-piece where it is supported by the pad 223 of the slide 221. In this position, the pin 226, the hand-lever 228, the link 229 and the pivot 230 all lie in the same plane, forming collectively a braced toggle, and the spring 231 is accordingly incapable of retracting the slide 222. When, however, the hand-lever 228 is tipped upwardly about the pivot-pin 226, the toggle is broken and the slide 222 is automatically withdrawn from the work-piece; the lever 225 and cap 233 are simultaneously raised by said spring 231, and the device assumes the open position shown in Fig. 12. In order that the steadies may be moved to the open position automatically as the tube 20 is fed through the dies, to permit the tube-feed carriage to pass the steadies as it approaches each in turn, an abutment 234 (Fig. 6) mounted on the casing 72 of said carriage is adapted to impinge against and co-act with an inclined surface 235 formed on the underside of a lug 236 carried by the hand-lever 228, the arrangement being such that the lever 228 is raised out of the "toggle-braced" position, whereupon the spring 231 causes the parts of the steady to open as aforesaid.

During the formation of a bend, the movable die 25 assumes a position substantially normal to the axis of that part of the work-piece which is passing through the die aperture at any given moment. When a bending operation is concluded, there exists between the movable die and the fixed die a short length of bent work-piece, which must pass through the aperture of the movable die without bending still further. To enable the movable die to accommodate itself to the forwardly moving work-piece without deforming the latter, it is consequently necessary to provide a spherical housing in which the operative portion of the movable die can pivot universally at this

(g) Construction of reciprocatory hydraulic motor

The motors 31, 37 and 70 are all of similar type and, as aforesaid, are characterised by an arrangement whereby the movement of a piston valve produces a corresponding extent of movement of the ram in the same direction. A typical motor of this kind is illustrated in Fig. 9 of the drawings, from which it will be seen that the motor comprises a cylinder 300 in which works a piston 301 fixed to a tubular ram or piston-rod 302 which is guided at the ends of the cylinder by suitable stuffing-glands 303. On opposite sides of the piston the rod 302 is furnished with pairs of diametrically opposed ports 304, 305 and 306, 307, and slidable within the bore of said rod 302 is a piston-valve 308 bored longitudinally to provide a fluid pressure inlet chamber 309 and a fluid pressure exhaust chamber 310, which chambers are respectively connected with flexible supply and exhaust pipes 311, 312. The inlet chamber 309 of the valve is provided with two inlet ports 313, 314, spaced at such distance apart that a longitudinal movement of the valve 308 is required to register one of its said inlet ports with one of the inlet ports 304, 306 of the piston-rod 302 to permit working liquid under pressure to enter the cylinder. The exhaust chamber 310 of the valve is provided with an exhaust port 305 or 307 of the piston-rod when the valve 308 is moved to admit pressure to the opposite side of the piston 301.

To produce a movement of the ram or piston-rod 302 towards the left as viewed in Fig. 9 (corresponding for example to the upward movement of the ram 33 of the motor 31), the valve 308 is moved in the same direction, admitting liquid under pressure from the inlet chamber 309 through the ports 313 and 314 to the right-hand end of the cylinder 300, and connecting the left-hand end of the cylinder to exhaust through the ports 307 and 315. The piston 301 and ram 302 continue to move until the port 313 has been masked by the piston-rod 302 and the port 315 by the piston itself, when movement ceases; thus the length of stroke of the ram 302 corresponds exactly with the extent of movement of the valve 308. The reverse operation, in which the liquid under pressure enters the left-hand end of the cylinder through the ports 314 and 306, and the right-hand end of the cylinder is connected to exhaust through the ports 305 and 315, is performed in like manner on the movement of the valve 308 towards the right.

(h) Hydraulic operating system

The hydraulic system employed for the operation of the machine hereindescribed incorporates three independent sub-systems the respective functions whereof are
 (I) The provision of power for the tube-feed motor 67,
 (II) The provision of power for the die-operating motors 31 and 37, and
 (III) The provision of power for operating the tube-rotating motor 70 on the travelling carriage.

Figures 13, 14:
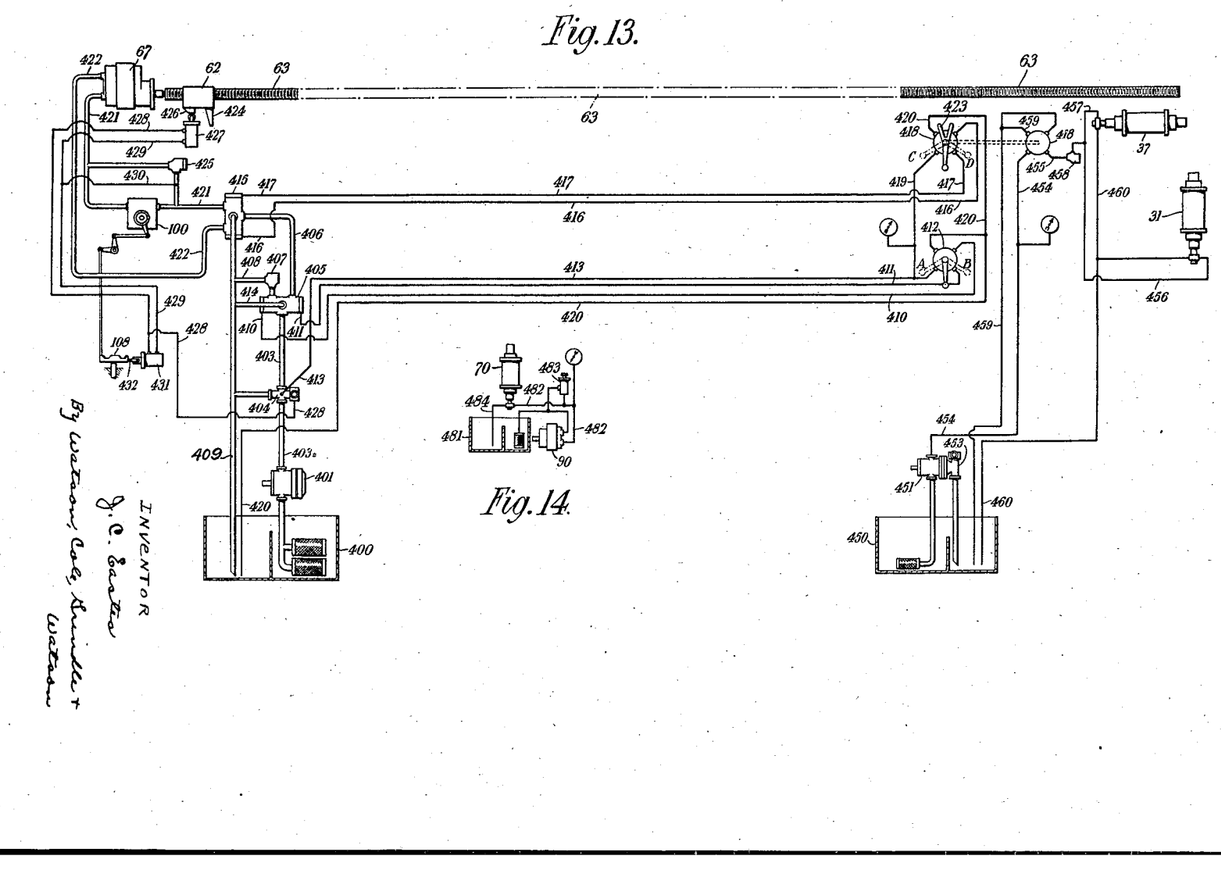
Fig. 13 is a schematic diagram of the hydraulic apparatus by which the several moving members of the machine are operated.
Fig. 14 is a similar diagram of the hydraulic apparatus incorporated in the tube-feeding carriage.

The first and second of these sub-systems are diagrammatically depicted in Fig. 13 of the drawings, and the third sub-system is similarly shown in Fig. 14. In Fig. 13 high-pressure pipe-lines are drawn in full, the single lines denoting medium pressure circuits.

Figure 4:
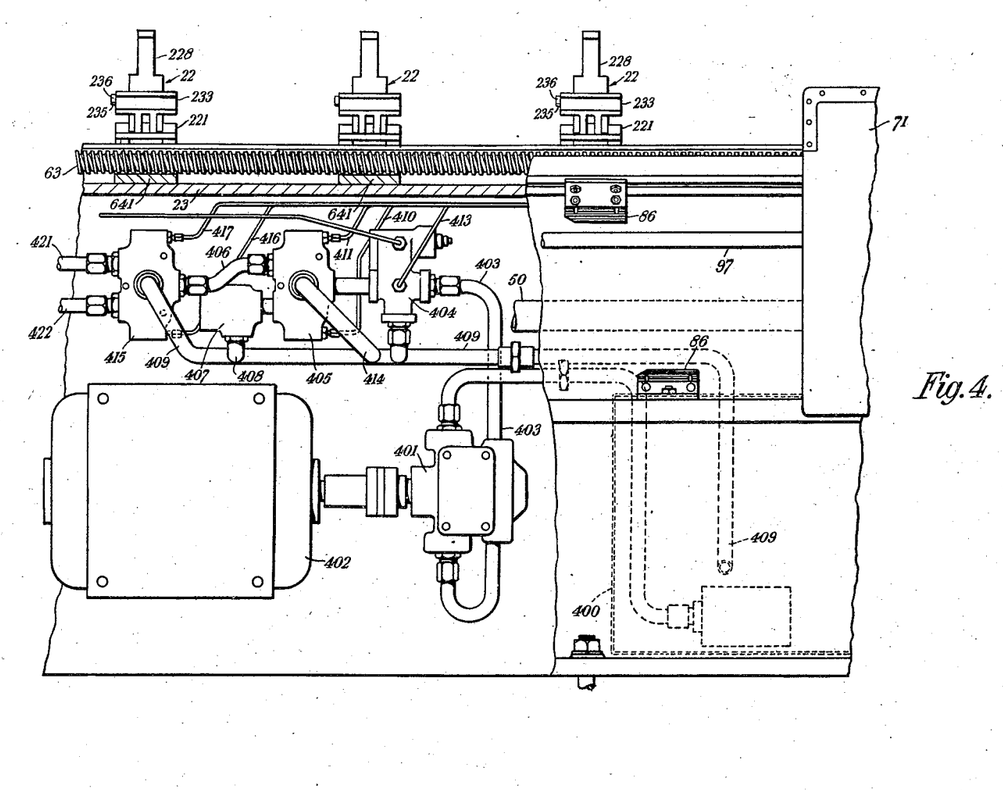

I. Referring to Fig. 13, it will be seen that hydraulic fluid is drawn from a reservoir 400 by a pump 401, driven by a constantly running electric motor 402 (see Fig. 4), and delivered by the pipe 403 through a relief-valve 404 to a four-way valve 405, which acts as an "on-off" valve, either delivering fluid to the circuit of the tube-feed motor 67 through the pipe 406 or returning the fluid to the reservoir 400 by way of a spring-loaded check-valve 407 and the pipes 408, 409. Said valve 405 is of the well-known moving-spool type capable of being operated by a low pressure pilot circuit; in this case the pilot circuit lines indicated at 410, 411 are controlled by a master pilot-valve 412, pressure for the pilot circut being obtained through the pipe 413 from the pressure side of the relief-valve 404.

When the operating lever of the pilot-valve 412 is moved to the position "A" (indicated in dotted lines), the line 410 is connected to the exhaust line 420 and connection is made through the valve between the lines 413 and 411, thus applying pressure to the right-hand end of the valve 405 and moving the spool of this valve to the left, the effect of which is to connect the pipe 403 to the check-valve 407 and the pipe 406 to a pipe 414 which leads into the return pipe 409, so that fluid flows through said check-valve 407 and back by the pipe 409 to the reservoir. This is the "off" position of the valve 405 and no power is supplied to the tube-feed motor 67. The purpose of the check-valve 407, which is heavily spring-loaded, is to maintain a pressure of approximately 75 pounds per square inch in the system, which pressure would suffice to operate the pilot-valve 412.

If the pilot-valve 412 is moved to the position indicated at B, the line 411 is connected to the exhaust 420 and communication is established between the lines 413 and 410, so that the valve 405 is reversed, moving to its "on" position, in which fluid flows by the pipes 403 and 406 to a reversing-valve 415. The valve 415 is likewise of the moving-spool type, and is controlled through a pilot circuit 416, 417 by means of a pilot-valve 418 (front bank) deriving pressure from the line 413 by a branch 419. With the lever of the pilot-valve 418 in the position indicated at C, the line 416 is connected to the exhaust line 420 and communication is established between the pressure line 419, 413 and the line 417; the effect of this is to move the spool of the valve 415 to connect the pressure line 406 to the pipe 421 of the tube-feed motor circuit, the other line 422 of this circuit being connected to the return pipe 409, so that fluid flows by the pipe 421 through the speed-control valve 100 to the motor 67, returning thence through the pipes 422 and 409. The motor 67 is now running in an anticlockwise direction, driving the screw 63 to feed the saddle 62 and tube 20 forward towards the bending dies.

On reaching the end of the travel of the carriage, the dog 423 on the lever of the pilot-valve 418 is tripped by an abutment 424 on the casing 72 and said lever is moved to the upright or neutral position. The spool of the valve 415 is centralised by its control spring and the fluid supply to the tube-feed motor 67 through the pipe 421 is shut off. The motor 67 is thus stopped to enable the bent tube to be removed from the chuck 24.

The lever of the pilot-valve 418 is next moved to the position D, so that the line 417 is connected to the exhaust line 420 and communication is established between the lines 419 and 416, reversing the valve 415 and delivering fluid to the tube-feed motor 67 in the opposite direction, i. e., by way of the pipe 422, returning to the reservoir through the one-way valve 425 (by-passing the speed control valve 100) and the pipes 421 and 409; thus, the rotation of the motor 67 is reversed and the saddle 62 returns to its starting point at full speed, the effect of by-passing the valve 100 being to prevent the cam 108 from affecting the speed of the carriage on its return journey during which no bending operations are taking place.

When the tube-feed carriage reaches the full return position a cam abutment 426 carried on the casing 72 impinges against the operating member of a valve 427, the effect of which is to arrest the travel of the carriage in the following manner:

The relief-valve 404 being of the balanced piston type, its piston will rise when pressure on its upper side is released, permitting fluid in the line 403 to return freely to the reservoir 409. A pipe 428 connects the unloading chambers of the valve 404 to one side of the valve 427, and when the valve 404 is in the normal position said line 428 is closed and pressure in the relief-valve 404 is maintained. When, however, the valve 427 is actuated by the cam abutment 426 on the return of the carriage, the line 428 is connected through the valve 427 to the line 429 and fluid in the line 428 is thus allowed to escape through the branch 430 into the line 421 by which it may return to the reservoir, thus unloading the relief-valve 404 and removing pressure from the circuit feeding fluid to the motor 67.

It is convenient to provide a similar pressure-release valve, i. e., the valve 431, connected in parallel with the valve 427 but arranged to be operated by a dog 432 on the speed control cam 108. By adjusting the position of said dog 432 in the T-groove provided in the periphery of the cam 108 (see Fig. 3), the return stroke of the saddle 62 may be arrested at any desired point, so that where a tube 20 to be bent is shorter than the maximum length of work-piece permitted by the dimensions of the machine, the starting point for the sequence of operations may be adjusted accordingly.

To start a new cycle of operations with either of the valves 427 or 431 open, it is sufficient to move the lever of the pilot-valve 418 to the position C. This action connects the pipe 421 to pressure, so that the relief-valve 404 is restored to its normal balanced condition by re-pressurising the lines 430, 429 and 428, and as soon as the carriage has moved forward from the starting-point, the valve 427 (or 431) is released and closed.

The pilot-valve 412 serves as a master valve for the control of the whole machine. The tube-feed motor 67 may be stopped at any position by moving the lever of the valve 412 to the position A.

II. Working liquid is supplied to the sub-system for operating the die motors 31 and 37 from a reservoir 450 by a pump 451 driven by a motor 452. The pump 451 incorporates a relief-valve 453 by which the pressure in this system may be set at a predetermined maximum, say 500 pounds per square inch. The pump 451 delivers fluid through the pipe 454 to the rear bank of the pilot-valve 418 the connections made by which are such that, when the tube-feed motor 67 is running anticlockwise to feed the work-piece towards the dies, fluid is delivered under pressure through the pipes 455, 456 and 457 to the die-operating motors 31 and 37 past the check-valve 458. On the return of the carriage to the starting point, when the valve 418 is in position D, the fluid delivered by the pump 451 returns freely to the reservoir 450 by way of the pipe 459. The exhaust connections from the motors 31 and 37 lead into the return pipe 460. The check-valve 457 serves to maintain the cylinders of the motors 31 and 37, and the pipes 456 and 457 full of working liquid at all times, although the operating pressure of such motors is only obtained when the pilot-valve 418 is in position C.

III. The sub-system relating to the tube-rotating motor 70 is depicted in Fig. 14, from which it will be seen that the low-pressure pump 90 draws working fluid from the reservoir 481 and delivers it through the pipe 482 past the relief-valve 483 to the pressure inlet of the motor 70, the exhaust connection whereof is indicated at 484. The relief-valve 483 serves to permit pressure fluid to return to the reservoir 481 when the motor 70 is at rest.

What I claim as my invention and desire to secure by Letters Patent is:

1. A machine for bending metal tubes, bars and like objects, comprising two dies arranged in tandem, through which the work-piece is passed in succession, the first of such dies being stationary and the second movable about two axes inclined to each other and to the longitudinal axis of the unbent work-piece so as to be capable of completely universal pivotal movement about said longitudinal axis in relation to the stationary die, means for moving the pivotal die in the required direction, and means for moving the work-piece through the dies during the bending operation.

2. A machine for bending metal tubes, bars and like objects, comprising two dies arranged in tandem, through which the work-piece is passed in succession, the first of such dies being stationary and the second movable about two axes inclined to each other and to the longitudinal axis of the unbent work-piece so as to be capable of completely universal pivotal movement about said longitudinal axis in relation to the stationary die, means for moving the pivotal die in the required direction, means for moving the work-piece through the dies during the bending operation and means for rotating the work-piece about its longitudinal axis during its passage through the dies.

3. A machine as claimed in claim 1, wherein the movable die is mounted for pivotal movement about a vertical axis and a horizontal axis perpendicular to the longitudinal axis of the unbent work-piece, either selectively or simultaneously, comprising two reciprocatory motors the moving members whereof are respectively linked to two pivots associated with the movable die, one such pivot being parallel to but off-set from the vertical pivotal axis of the die and the other pivot being parallel to but off-set from the horizontal pivotal axis of the die.

4. A machine as claimed in claim 1 comprising means for reducing the speed at which the work-piece is advanced through the bending dies, such speed-reducing means operating automatically as each bending operation commences and for the duration thereof.

5. A machine as claimed in claim 2, comprising a carriage associated with the gripping means and arranged to traverse the machine as the work-piece is advanced to the bending dies, a reciprocatory motor on said carriage and gearing between the movable member of said motor and said gripping means in such fashion that the operation of said motor produces a partial rotation of the work-piece.

6. A machine for bending metal tubes, bars and like objects, comprising two dies arranged in tandem, through which the work-piece is passed in succession, the first of such dies being stationary and the second movable about two axes inclined to each other and to the longitudinal axis of the unbent work-piece so as to be capable of completely universal pivotal movement about such longitudinal axis in relation to the stationary die, means for moving the pivotal die in the required direction, means for supporting the unbent portion of the work-piece at spaced points in its length preparatory to and during its passage through the bending dies, means for gripping the rear end of the work-piece, a push-bench for said gripping means, means for advancing said gripping means along the push-bench to impel the work-piece through the dies, and means for reducing the speed at which the work-piece is advanced through the bending dies, such speed-reducing means operating automatically as each bending operation commences and for the duration thereof.

7. A machine as claimed in claim 6, comprising a saddle associated with the work-piece gripping means, a lead-screw cooperating with a nut on said saddle to traverse the latter along the push-bench in either direction according to the rotation of said screw, and a rotary motor for driving said screw.

8. A machine as claimed in claim 6, comprising a saddle associated with the work-piece gripping means, a lead-screw cooperating with a nut on said saddle to traverse the latter along the push-bench in either direction according to the rotation of said screw, a rotary motor for driving said screw, a cam driven by the rotary motor, a regulator for varying the speed of said motor, and a cam-follower operatively connected on said regulator and adapted to cooperate with the face of said cam, said cam being shaped to effect the necessary movements of said regulator through the medium of the cam-follower to vary the motor speed as required.

9. A machine for bending metal tubes, bars and like objects, comprising two dies arranged in tandem, through which the work-piece is passed in succession, the first of such dies being stationary and the second movable about two axes inclined to each other and to the longitudinal axis of the unbent work-piece so as to be capable of completely universal pivotal movement about said longitudinal axis in relation to the stationary die, means for moving the pivotal die in the required direction, means for moving the work-piece through the dies during the bending operation, a carriage associated with the gripping means and arranged to traverse the machine as the work-piece is advanced to the bending dies, a reciprocatory motor on said carriage, gearing between the movable member of said motor and the gripping means so arranged that the operation of said motor produces a partial rotation of the work-piece, and control means for said reciprocatory motor, said control means comprising cam-like kicker-plates located in the path of the carriage and means adapted to engage said kicker-plates for actuating said motor in the appropriate direction at the requisite stages in the movement of the work-piece through the dies.

10. A machine for bending metal tubes, bars and like objects, comprising two dies arranged in tandem, through which the work-piece is passed in succession, the first of such dies being stationary and the second movable about two axes inclined to each other and to the longitudinal axis of the unbent work-piece so as to be capable of completely universal pivotal movement about said longitudinal axis in relation to the stationary die, means for moving the pivotal die in the required direction, means for moving the work-piece through the dies during the bending operation, two reciprocatory motors, the moving members whereof are respectively linked to two pivots associated with the movable die, one of such pivots being parallel to but offset from the vertical pivotal axis of the die, and the other pivot being parallel to but offset from the horizontal pivotal axis of the die, each of said reciprocatory motors having a cam-follower associated therewith, and a cam adapted to engage each of said cam-followers, said cams being shaped to effect the movements of the cam-followers which are requisite to actuate the respective motors so as to pivot the movable die through the desired angle.

11. A machine as claimed in claim 10, said reciprocatory motors each comprising a cylinder, a piston, and a piston-valve so arranged that movement of the piston-valve causes corresponding movement of the piston in the same direction.

12. A machine for bending metal tubes, bars and like objects, comprising two dies arranged in tandem, through which the work-piece is passed in succession, the first of such dies being stationary and the second movable about two axes inclined to each other and to the longitudinal axis of the unbent work-piece so as to be capable of completely universal pivotal movement about said longitudinal axis in relation to the stationary die, means for moving the pivotal die in the required direction, means for moving the work-piece through the dies during the bending operation, means for reducing the speed at which the work-piece is advanced through the bending dies, such speed-reducing means operating automatically as each bending operation commences and for the duration thereof, and said speed-reducing means being automatically rendered inoperative when said mechanism is returned in reverse to its starting position.

JOHN COLBRAN EASTES.

REFERENCES CITED

The following references are of record in the file of this patent:

UNITED STATES PATENTS

| Number | Name | Date |
| --- | --- | --- |
| 717,178 | Earle | Dec. 30, 1902 |
| 1,936,765 | Lawson | Nov. 28, 1933 |
| 2,306,224 | Parker et al. | Dec. 22, 1942 |
| 2,341,178 | Duer | Feb. 8, 1944 |
| 2,357,812 | Duer | Sept. 12, 1944 |